United States Patent [19]
Bradley

[11] Patent Number: 6,037,550
[45] Date of Patent: *Mar. 14, 2000

[54] ON-BOARD VEHICLE WEIGHING APPARATUS AND METHOD

[75] Inventor: Richard Bradley, Estero, Fla.

[73] Assignee: Weigh-Tronix, Inc., Fairmont, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/941,164

[22] Filed: Sep. 30, 1997

[51] Int. Cl.[7] .................................................. G01G 19/08
[52] U.S. Cl. ........................................ 177/136; 702/174
[58] Field of Search ..................................... 177/136, 137, 177/138, 139, 211, 229; 702/173, 174, 175

[56] References Cited

U.S. PATENT DOCUMENTS

| | | | |
|---|---|---|---|
| 3,854,540 | 12/1974 | Holmstrom, Jr. | 177/136 |
| 4,694,921 | 9/1987 | Johnson | 177/136 |
| 5,161,628 | 11/1992 | Wirth | 177/137 |
| 5,313,023 | 5/1994 | Johnson | 177/229 |
| 5,493,920 | 2/1996 | Schedrat et al. | 177/211 |
| 5,780,782 | 7/1998 | O'Dea | 177/136 |

*Primary Examiner*—Randy W. Gibson
*Attorney, Agent, or Firm*—Gray Cary Ware & Freidenrich LLP

[57] ABSTRACT

An apparatus for measuring the weight of a load carried by a vehicle is provided wherein the vehicle has a tractor, a trailer, and a fifth wheel assembly attached to the trailer for connecting said trailer to said tractor, the trailer having an axle, and the apparatus comprising a system, located on the trailer, for measuring the weight of the trailer and for generating a weight value, and a system, located within the trailer, for displaying the weight value. The measuring system comprises a first weight sensing means located within the fifth wheel assembly for producing a first weight signal, a second weight sensing means located within a first end of said trailer axle for producing a second weight signal, a third weight sensing means located within a second end of said trailer axle for producing a third weight signal, and means for combining said first, second and third weight signals to produce said weight value. A method for measuring the weight of a load carried by a vehicle is also disclosed.

20 Claims, 6 Drawing Sheets

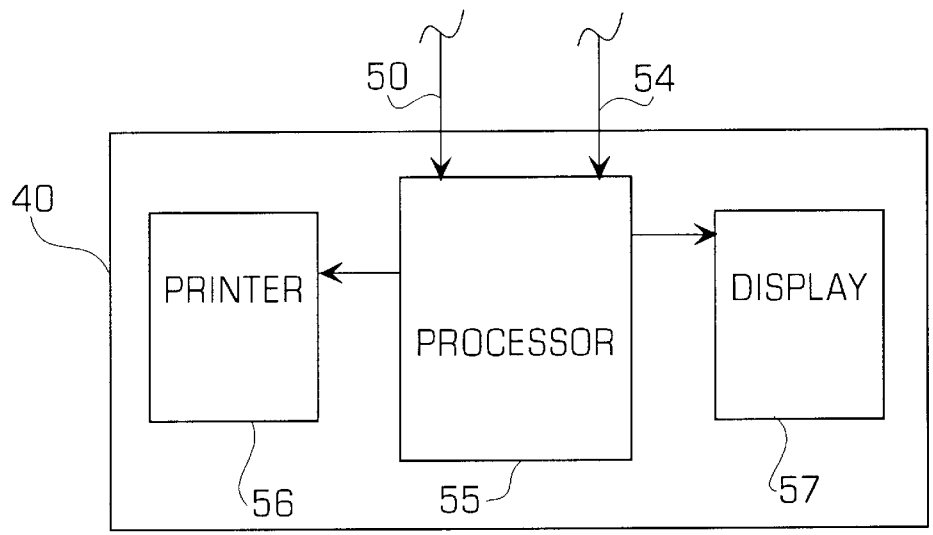
FIGURE 3
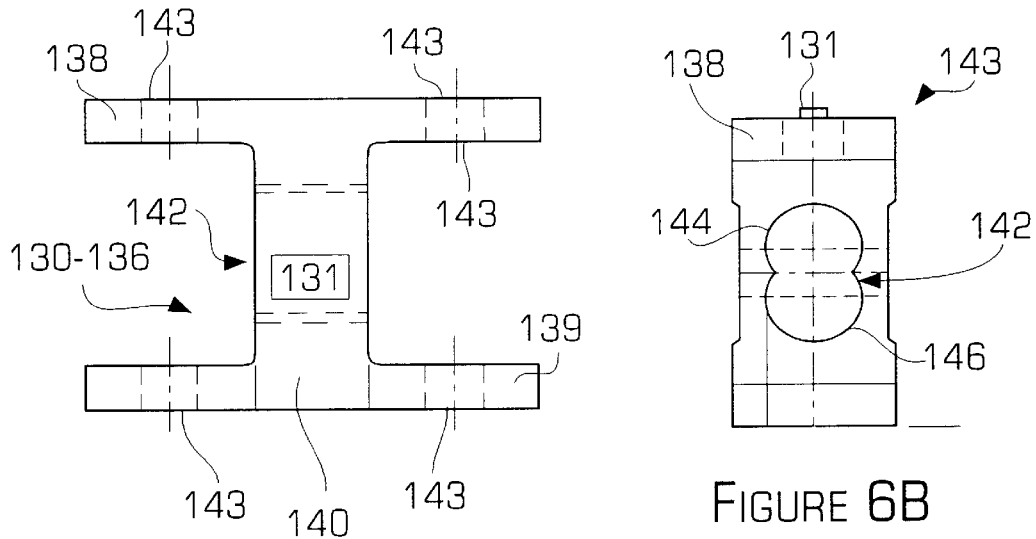
FIGURE 6A
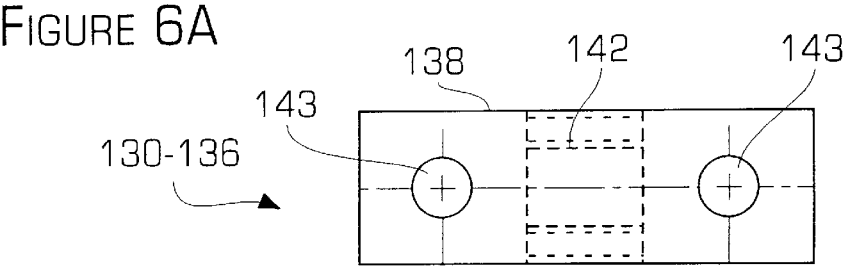
FIGURE 6B
FIGURE 6C

ON-BOARD VEHICLE WEIGHING APPARATUS AND METHOD

BACKGROUND OF THE INVENTION

This invention relates generally to a weighing system located on-board a vehicle, for weighing the load being carried by the vehicle.

For many commercial vehicles, e.g., common carriers, it is necessary to determine the weight being carried by the vehicle for sales transaction purposes or to ensure the vehicle is not overweight in violation of Weights & Measures Requirements. The accuracy of the scale is specified by government agencies and is certified as being "legal for trade".

As far back as 1960, companies have attempted to develop an on-board weighing scales for commercial vehicles that have a fifth wheel assembly, such as a tractor-trailer truck. The ability to measure the weight of the cargo contained in the trailer of a commercial vehicle in a simple manner with an on-board vehicle scale sufficiently accurate to be certified as "legal for trade" is very desirable. A "legal for trade" weighing scale avoids the necessity of having a truck go over a stationary legal scale to determine cargo weights.

Without an on-board vehicle scale, the truck must return to a facility where the changes in cargo weight can be determined. This is usually a facility that can weigh the whole truck prior to loading the cargo and after loading the cargo or vice versa. However, if cargo is partially off loaded, multiple trips to the weighing facility are necessary to determine the amount of cargo off loaded, which is time-consuming and inefficient. The truck may also have to stop at a highway weighing station to be weighed to see if it is overweight. If so, fines will be assessed. Therefore, most commercial trucking companies would like to be able to measure the weight of cargo being carried by a vehicle using an on-board vehicle scale. However, even with all of this need for a "legal for trade" on-board vehicle scale, success has been limited.

The only industry that currently uses on-board vehicle scales is the logging industry. However, these scales used by the logging industry have been unable to achieve the required accuracy and are not "legal for trade". Since the accuracy requirements are not obtainable with current on-board vehicle scales, these current on-board scales may only be used to determine approximate weights for the purpose of preventing overload fines, but may not be used to determine the weight for commercial transactions. In addition, these scales typically required costly maintenance and service and have been generally unsuccessful.

There are a number of commercial enterprises governed by the Interstate Commerce Commission regulations that charge a customer a fee based on the weight of the cargo or the weight of the material that is being sold to a customer, such as moving vans. In addition, liquid commodities, such as milk, ink and chemicals are often sold by weight as well as many bulk commodities, and are other examples of industries that could benefit from a "legal for trade" on-board vehicle scale. In fact, any industry that uses weight as a measure of quantity of goods or materials delivered may benefit from having an on-board vehicle scale that is certified "legal for trade".

Conventional on-board vehicle scales have never been certified as "legal for trade" because the sensing systems within these conventional on-board vehicle scales are not sufficiently accurate to meet the rigid tolerance requirements of a "legal for trade" weighing scale. In addition, most conventional on-board vehicle scales require the retro-fitting of existing vehicles which is very expensive. Some conventional on-board vehicle scales also require the insertion of weight sensors within the vehicle's chassis or weight bearing elements which may adversely affect the structural integrity of the vehicle.

Thus, there is a need for an on-board vehicle scale for measuring the weight of a load carried by the vehicle which avoids these and other problems of known systems, and it is to this end that the present invention is directed.

SUMMARY OF THE INVENTION

The invention provides an on-board vehicle scale that may be located entirely within the load carrying portion of a vehicle, such as a trailer attached to a tractor, wherein the trailer is supported by a fifth wheel assembly and one or more rear axles. The location of the scale entirely within the trailer provides several advantages. First, the owner of several tractors and trailers may mix and match the tractors and trailers without worrying about the connections of the on-board vehicle scale. Second, less maintenance is required because there are no electrical or other cables associated with the scale running between the tractor and the trailer. Third, the expensive parts of the scale, such as the indicator system, such as a display and a printer, may be located within a locked enclosure of the trailer to reduce risks of theft and damage. The indicator system may also be locked within the enclosure so that the scale qualifies as a "legal for trade" scale.

The sensing devices of the on-board vehicle scale may be incorporated into existing structural parts of the trailer to sense weight so that the structural integrity of the parts of the trailer is maintained while providing accuracy to meet the tolerance requirements so that the on-board vehicle scale may be certified as a "legal for trade" scale. The indicator system, that may include a display and a printer, may be sealed within an enclosure on the trailer to prevent tampering.

In one aspect, the invention provides an apparatus and method for measuring the weight of a load carried by a vehicle which includes a tractor, a trailer, and a fifth wheel assembly attached to the trailer for connecting said trailer to said tractor. The trailer may have a pair of rear axles, and there is a system, that may be located entirely within the trailer, for measuring the weight of the trailer and any cargo and for generating a weight value representative of the weight. There may also be an indicator, that may be located within a sealed enclosure in the trailer, for displaying the weight value. The measuring system may include a first weight sensing means located within the fifth wheel assembly for producing a first weight signal, a second weight sensing means located adjacent ends of each of the rear axles of the trailer for producing a second weight signal, and a system for combining said first and second weight signals to produce a total weight value.

BRIEF DESCRIPTION OF THE DRAWINGS

FIG. 3 is a block diagram of the indicator system shown in FIG. 2;

FIGS. 6A, 6B and 6C are an front view, an end view, and a top view, respectively, of a fifth wheel weight sensor in accordance with the invention;

DETAILED DESCRIPTION OF A PREFERRED EMBODIMENT

The invention is particularly applicable to a tractor-trailer vehicle comprising a trailer connected to a tractor by a fifth wheel assembly. It is in this context that the invention will be described. It will be appreciated, however, that the system and method in accordance with the invention has greater utility.

Figure 1:
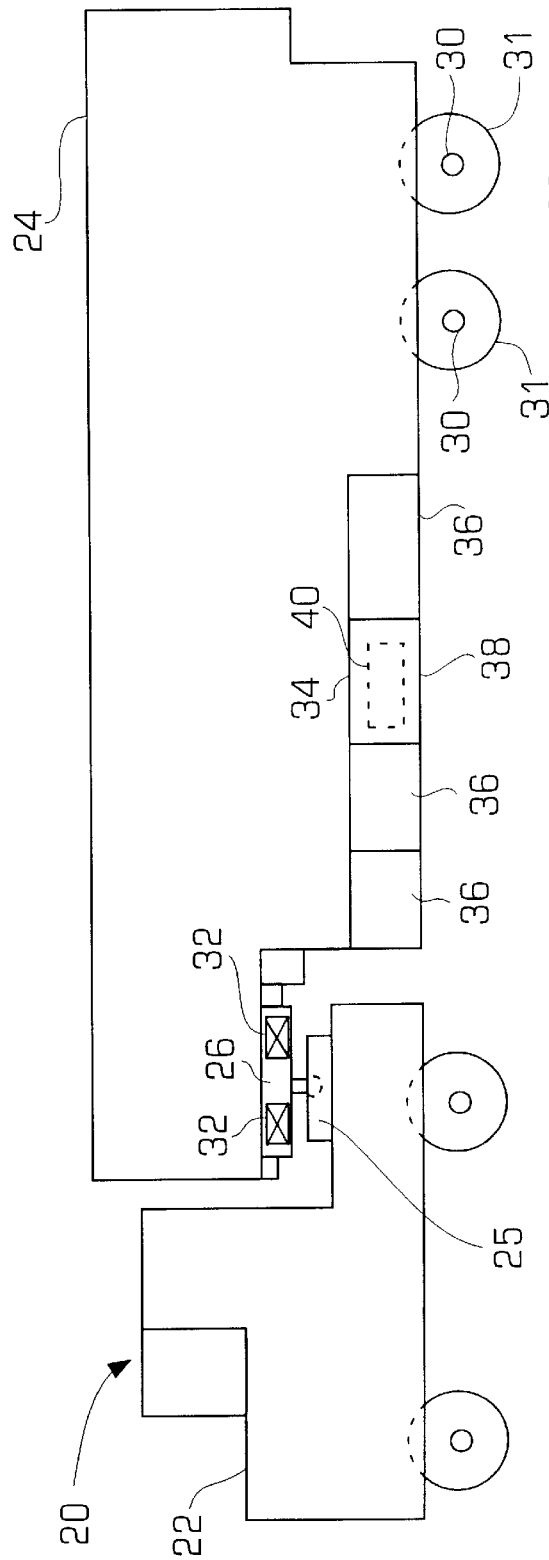
FIG. 1 is a side view of a vehicle, such as a tractor-trailer truck that may have an on-board scale in accordance with the invention.

FIG. 1 is a side view of a vehicle 20, such as a tractor-trailer vehicle, that may incorporate an on-board vehicle scale in accordance with the invention. The vehicle may comprise a tractor 22 and a trailer 24 which may be connected together by a connector 25, also known as a kingpin, attached to the trailer fifth wheel assembly 26. The trailer may have a pair of rear axle assemblies 30 supporting rear wheels 31 so the weight of the trailer and its cargo are supported by the fifth wheel assembly and tractor and by the pair of rear wheels and axle assemblies. The on-board vehicle scale may have a fifth wheel sensing assembly 32 located within the fifth wheel assembly, as described in more detail below, for measuring the weight of the load carried by the fifth wheel assembly and a rear axle weight sensing assembly, as described below, that measures the weight of the load carried by the rear axles. The trailer may also have a storage area 34 located underneath of the trailer that may include several storage areas 36, and a sealed enclosure 38. The sealed enclosure may house an indicator system 40 for the on-board vehicle scale that outputs the total weight signal measured by the on-board vehicle scale in accordance with the invention. The indicator system may include a processor, a printer and a display. The enclosure is sealed and locked, as required to be certified as "legal for trade" to prevent tampering with the output of the display or the printer.

The on-board vehicle scale may be preferably housed entirely within the trailer 24. This provides several advantages, including the elimination of scale connections running between the tractor and the trailer that may be susceptible to damage, and may need to be maintained frequently because they are exposed to the weather. In addition, the enclosure 38 provides an easy way of protecting the display and the printer from weather, heat or dust. The location of the scale entirely within the trailer facilitates legal for trade sealing requirements. A person may also easily mix and match tractors with a trailer because the on-board vehicle scale does not require a special tractor.

Figure 2:
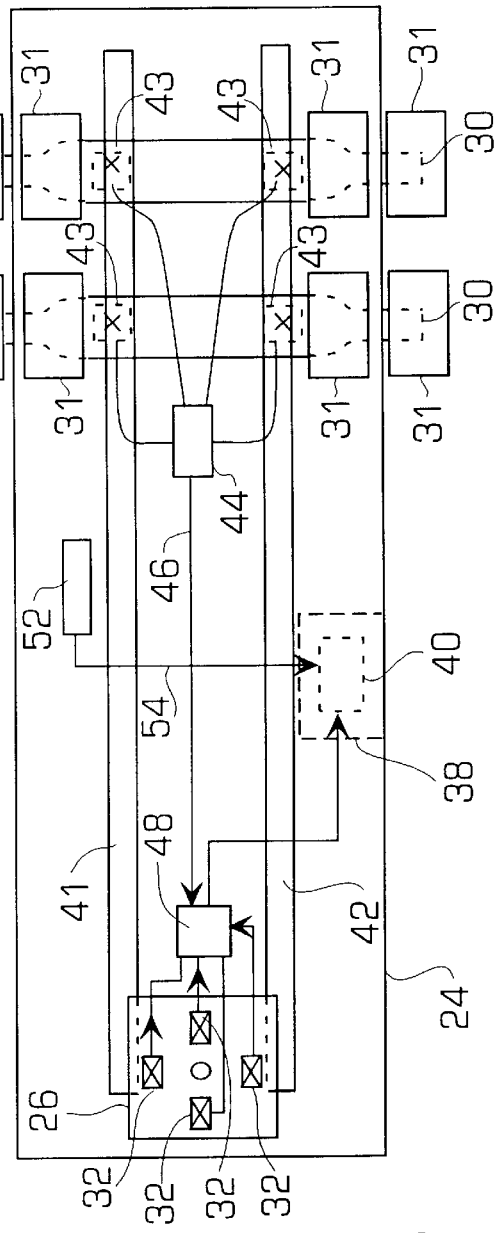
FIG. 2 is a bottom view of the trailer of FIG. 1 showing the details of the on-board vehicle scale in accordance with the invention.

FIG. 2 is a bottom view of the trailer 24 of the vehicle 20 of FIG. 1 showing more details of the on-board vehicle scale in accordance with the invention. The trailer may have a pair of rails 41, 42 that run the length of the trailer and support the trailer enclosure and the load carried by the trailer within the enclosure. In addition to the fifth wheel sensing assembly 32, and the sealed enclosure 38, the on-board vehicle scale may also have a rear axle sensing assembly 43, that may be a pair of sensors located at each end of each rear axle assembly 30, for a total of eight sensors located on the rear axle. The fifth wheel sensing assembly 32 may include four sensors. To measure the weight of the load being carried by the trailer, the weight signals from the rear axle sensing assembly 30 may be routed to a waterproof junction box 44 adjacent the rear axle, where they may be combined and conveyed by a wire 46 to a second waterproof junction box 48 located adjacent to the fifth wheel assembly. Each of the waterproof junction boxes 44, 48 may sum the weight signals from the sensors located near the junction box. For example, the junction box 44 may combine the weight signals of the eight sensors located on the rear axle. The combined summed weight signals from the fifth wheel sensing assembly 32 and the rear axle sensing assembly 30 may then be communicated over a wire 50 or cable to the indicator system 40 located in the sealed enclosure 38. The indicator system 40 will be described below with reference to FIG. 3.

The on-board vehicle scale, in accordance with the invention, has a tilt sensing assembly 52, located near the middle of the trailer, that measures the tilt of the trailer. The tilt sensing assembly outputs a signal corresponding to the angle of tilt of the trailer, and the angle of tilt is used to compensate the measured weight signals for any tilt of the trailer, in a well known manner. To compensate the weight signals, the tilt signal is communicated over a wire or cable 54 into the sealed enclosure 38, and the indicator system 40 within the sealed enclosure performs the adjustment to the weight signals. The various elements of the scale, such as the junction boxes, the sensors, and the wires/cables may be enclosed within steel conduits or other protective enclosures to prevent damage. As shown, the entire structure of the on-board vehicle scale, in accordance with the invention, may be contained within the trailer of the vehicle which has the advantages described above.

FIG. 3 is a block diagram of the indicator system 40 that may be located within the sealed enclosure 38. The indicator system may include a processor 55, a printer 56 and a display. The combined weight signal on wire 50 may be processed by the processor 55 into a total weight signal and output to the printer 56 and the display 57. As described above, the indicator system 40 may be legally sealed within the enclosure 38 both for protection and so that the on-board vehicle scale in accordance with the invention may be certified as "legal for trade". The fifth wheel sensing assembly and the rear axle sensing assembly may be thought of as separate weight scales whose measured weights may be combined to determine the overall weight of the trailer and the cargo in the trailer. Now, in order to better understand the invention, a conventional fifth wheel assembly will be briefly described first, then a modified fifth wheel having a sensing assembly in accordance with the invention will be described.

Figure 4A:
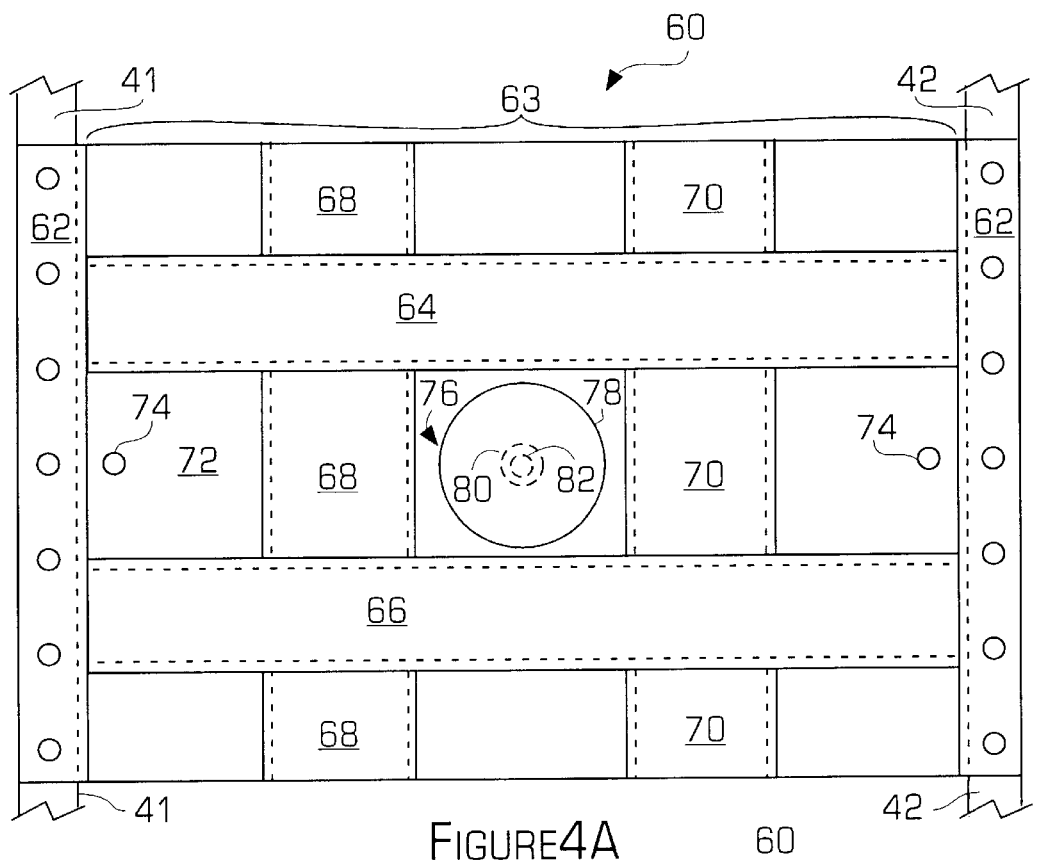
FIGS. 4A and 4B are a top view and a side view, respectively, of a conventional fifth wheel assembly that typically connects a tractor to a trailer in a tractor-trailer truck.
Figure 4B:
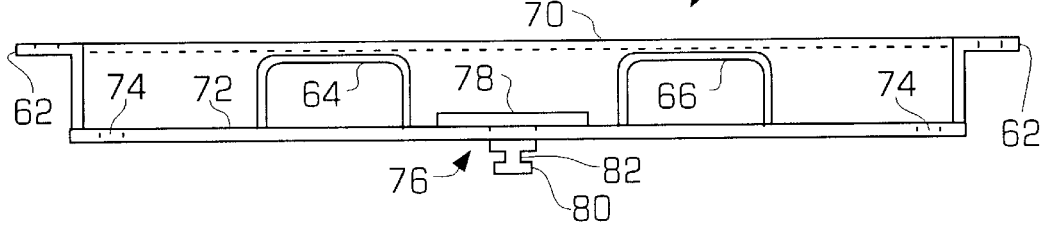

FIGS. 4A and 4B are a top view and side view, respectively, of a conventional fifth wheel assembly 60 that is rigidly connected to the trailer. The fifth wheel assembly 60 may include a central weight carrying portion 63 attached to a flat plate 72, and a kingpin assembly 76, as described below, attached to the flat plate. The central weight carrying portion 63 may also be connected to an upwardly extending right-angled flanges 62 on each longitudinal side of the fifth wheel assembly for connecting the fifth wheel assembly to the rails 41, 42 of the trailer shown in FIG. 2. The central weight carrying portion 63 may include a number of U-shaped channel structural members that may be connected together so that some of the channel members are substantially perpendicular to each other. In particular, the central weight carrying portion may have a first and second laterally extending U-shaped channel 64, 66 and a first and second longitudinally extending channel segments 68, 70 that connect to the laterally extending channels and form a web of structural members. The legs of the channels may be connected to the flat plate 72. The flat plate 72 that may have a plurality of drain holes 74 for permitting water to drain out of the fifth wheel assembly.

The kingpin assembly 76 may be attached to the flat plate 72 for connecting the fifth wheel assembly and the trailer to the tractor connector 25. The kingpin assembly may include a generally circular planar bottom portion 78 that may be welded to the bottom plate 72 and a second substantially cylindrical depending post 80 which extends through plate 72 and has a notched portion 82. As described above, the depending post and notch portion may releasably attach to the connector 25 which is attached to the tractor 22, as shown in FIG. 1. As described in more detail below, the on-board vehicle scale of the invention may use a modified fifth wheel assembly formed to sense the weight of the trailer applied to the fifth wheel connection to the trailer by the cargo being carried by the trailer. As will be appreciated from the following, the modified fifth wheel assembly, in accordance with the invention, may be easily retro-fitted onto existing trailers by replacing the existing conventional fifth wheel assembly. Now, the modified fifth wheel assembly with a fifth wheel sensing assembly that is part of the on-board vehicle scale in accordance with the invention will be described.

Figure 5A:
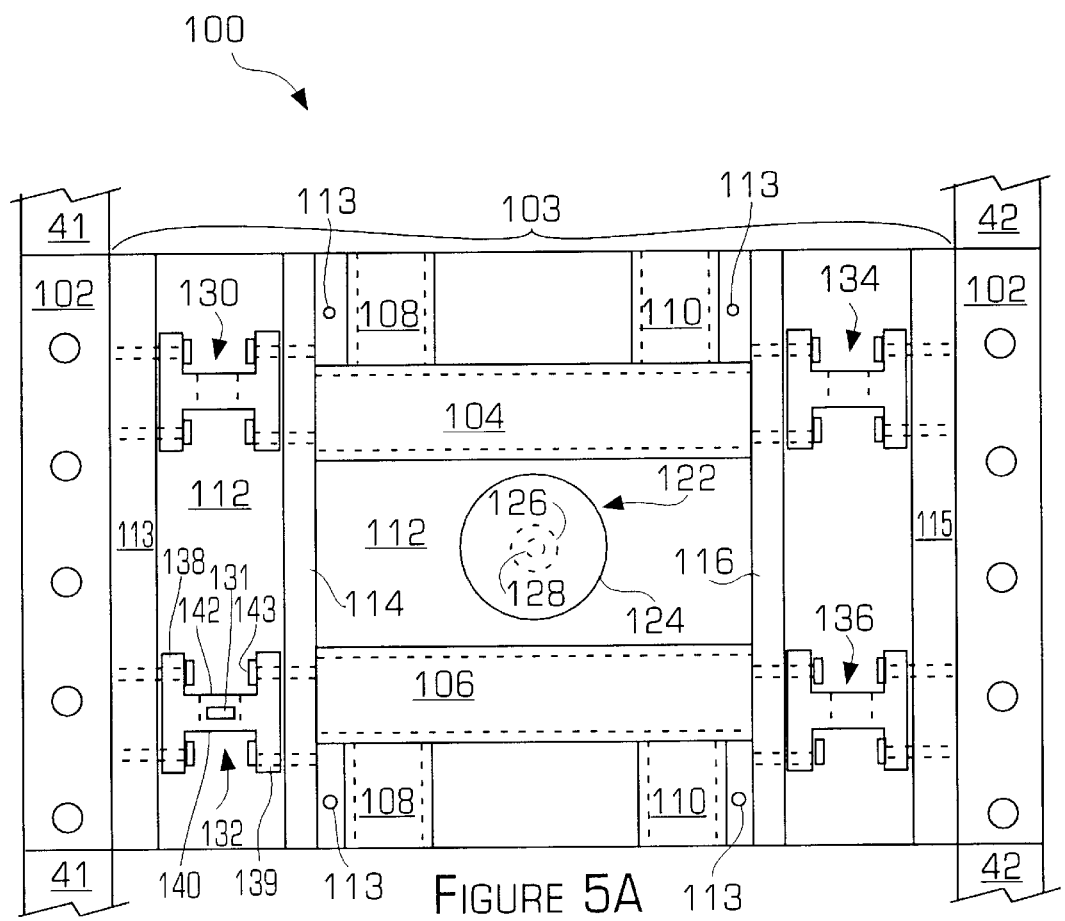
FIGS. 5A and 5B are a top view and an end view, respectively, of a modified fifth wheel assembly with weight sensors in accordance with the invention.
Figure 5B:
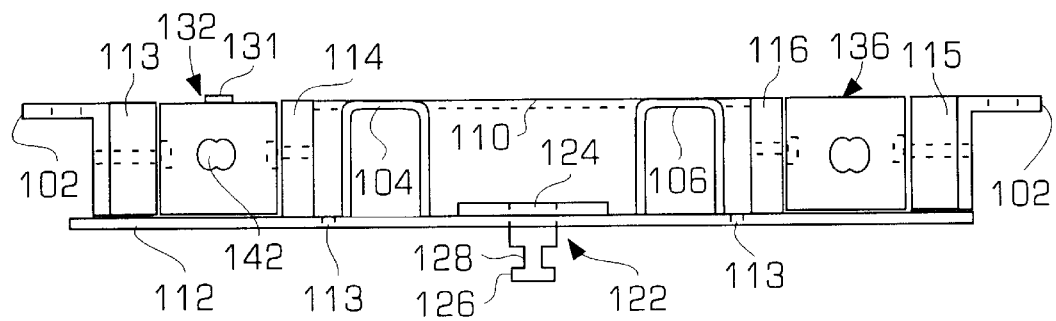

FIGS. 5A and 5B are a top view and a side view, respectively, of a modified fifth wheel assembly 100 that may include a fifth wheel sensing assembly that is part of the on-board vehicle scale in accordance with the invention. The basic structure of the modified fifth wheel assembly 100 is similar to a conventional fifth wheel assembly in that it may include a central structural portion 103, a flat plate 112 attached to the central structural portion, a kingpin assembly 122 attached to the flat plate 112, and a pair of lateral upwardly extending right angle flanges 102 for connection of the fifth wheel assembly 100 and the kingpin assembly 122 to the rails 41, 42 of the trailer through first and second outer bars 113, 115 and weight sensing assemblies 130, 132, 134, 136.

The central structural portion 103 may have first and second laterally extending U-shaped channels 104, 106 and first and second longitudinally extending U-shape channel segments 108, 110 that may intersect the channels 104, 106 at preferably right angles to form a web of structural channels attached to the flat plate 112. The ends of the laterally extending channels 104, 106 may be connected to first and second inner bars 114, 116. The inner bars 114, 116 may also be connected to the weight sensing assemblies 130–136 and the flat plate 112. As described above, the flat plate may have a plurality of drain holes 113.

The rails 41, 42 of FIG. 1 that partially support the weight of the trailer, may also run the length of the fifth wheel assembly parallel to the inner bars 114, 116 and connect to flanges 102. As described above, the kingpin assembly 122 may have a circular plate 124 rigidly attached to the bottom plate 112, a depending stub 126 having a narrower middle notch portion 128 that may releasably connect the trailer to the connector which is attached to the tractor.

The flanges 102, the outer bars 113, 115, and the weight sensing assemblies 130–136 are not attached to the bottom plate 112 and float above the bottom plate so that any load on the rails must be transferred through the weight sensing assemblies 130–136 to the kingpin assembly as described below. Rather, the flanges may be connected through the outer bars 113, 115 and the weight sensing assemblies 130–136, as described below, to the inner bars 114, 116 that are in turn connected to the flat plate 112 and the central structural portion 103. Therefore, a load on the rails 41, 42, proportional to the weight of the cargo and the trailer, may be isolated from the kingpin assembly by the weight sensing assemblies. In particular, a load on the rails 41, 42 may be transferred through the flanges 102, the outer bars 113, 115 and the weight sensing assemblies 130–136, which are not rigidly attached to the flat plate 112. The load, that is first measured by the weight sensing assemblies, may be transferred through the relatively stiff weight sensing assemblies to the inner bars 114, 116, the flat plate 112, and the kingpin assembly 122. Because the weight must be transferred through the weight sensing assemblies, the weight sensing assemblies necessarily measure the entire load on the kingpin assembly.

The bottom plate 112 may extend below the weight sensing assemblies and the flanges to protect them from dirt and damage, but the flanges and weight sensing assemblies are spaced slightly above and not directly connected to the bottom plate so that, as described above, any load on the trailer is transmitted through the flanges, the outer bars and the weight sensing assemblies to the central structural portion and the kingpin assembly. Therefore, any weight upon the kingpin assembly must be transmitted through the weight sensors.

The four weight sensing assemblies 130, 132, 134, 136, located preferably at the corners of the fifth wheel assembly 100, may rigidly connect the flanges 102 and the rails 41, 42 to the inner bars 114, 116 so that the load on the rails is transferred directly through the weight sensing assemblies to the inner bars 114, 116, the bottom plate 112, and to the kingpin assembly 122. The weight sensing assemblies may be located substantially equidistant from the kingpin so that each weight sensing assembly produces equivalent weight signals for a load on the fifth wheel assembly and the kingpin. Each of the weight sensing assemblies may be similar and the structure of only one will be described in detail.

Referring to FIGS. 5A, 5B, 6A, 6B, and 6C, the weight sensing assembly 132 may preferably have a sensor body that is H-shaped, and may comprise first and second parallel legs 138, 139 and a central leg 140 that connects the two parallel legs 138, 139. Each weight sensing assembly may also have an inner aperture 142 that may be located within the central leg 140 of the H-shaped sensor body. The weight sensing assembly sensor body may be constructed out of a metal, such as a steel alloy, but may also be constructed out of plastic. In the embodiment shown, the inner aperture 142 has the shape of two overlapping circles, but the inner aperture is not limited to any particular shape. A preferred inner aperture shape may include a first circle 144 and a second circle 146 that are overlapped. The inner aperture forms a parallelogram shaped weight sensing assembly having end beams and load beams connected to the end beams. The inner aperture within each sensor body also permits the bulk of the material used to manufacture the sensor body, such as stainless steel, to be located near the outer edges of the sensor body, which in turn provides less rigidly and enables the sensor to react more quickly to a load being exerted on the sensor body. In particular, the sensor with the inner aperture does not have as much material that must be deformed which reduces the time required to sense a load. Each sensor may also be made without an inner aperture which reduces the size of the sensor body, however, the sensor body without the inner aperture has more material within the sensor body which means that the time required for the sensor to react to an applied load increases. As with other conventional sensors and load cells, a sensing element 131 that actually measure the strain of the weight sensing assembly body in response to an applied load are located in close proximity to the narrow portion of the sensor body formed by the inner aperture. A preferred weight sensor is disclosed in U.S. Pat. No. 5,313,023, assigned to the same assignee as this patent, which is incorporated herein by reference. Generally, a tension sensing element and a compression sensing element may be used so that common mode effects are rejected. The sensor body may be attached to the flanges 102, the rails 41, 42 and the inner bars 114, 116 respectively by a plurality of attachment mechanisms 143, such as bolts.

As shown, the flanges 102, the rails 41, 42, and the outer bars 113, 115 are not directly connected to the central structure 103 or the flat plate 112 and "float" above the flat plate 112. Thus, any load on these elements may only be transferred to the central structural portion 103 and the kingpin assembly 122 through the weight sensing assemblies 130–136. Therefore, the weight sensing assemblies isolates the kingpin assembly 122 from the rails 41, 42.

In operation, the load carried in the trailer causes a strain on the rails 41, 42, which in turn causes a strain on the weight sensing assemblies that may be connected to the rails 41, 42 through the free floating flanges 102 and the free floating outer bars 113, 115. The strain on the weight sensing assemblies may be measured, in accordance with the invention, and the strain may also be transferred, due to the stiff weight sensing assemblies, to the kingpin assembly 122 through the inner bars 114, 116 and the bottom plate 112. The operation of a weight sensing assembly is well known and will not be described. The detailed operation of the fifth wheel sensing assembly will be described in more detail below.

As described above, a trailer having a conventional fifth wheel assembly may be easily retro-fitted with the modified fifth wheel assembly with the sensing assembly in accordance with the invention since the invention does not require substantial modification of the structural elements the fifth wheel assembly. The other parts of the on-board vehicle scale may also be easily incorporated into an existing trailer without damaging the structural integrity of the trailer. Now, a modified rear trailer axle that may contain the axle sensing assemblies that may be a part of the on-board vehicle in accordance with the invention will be described.

Figure 7:
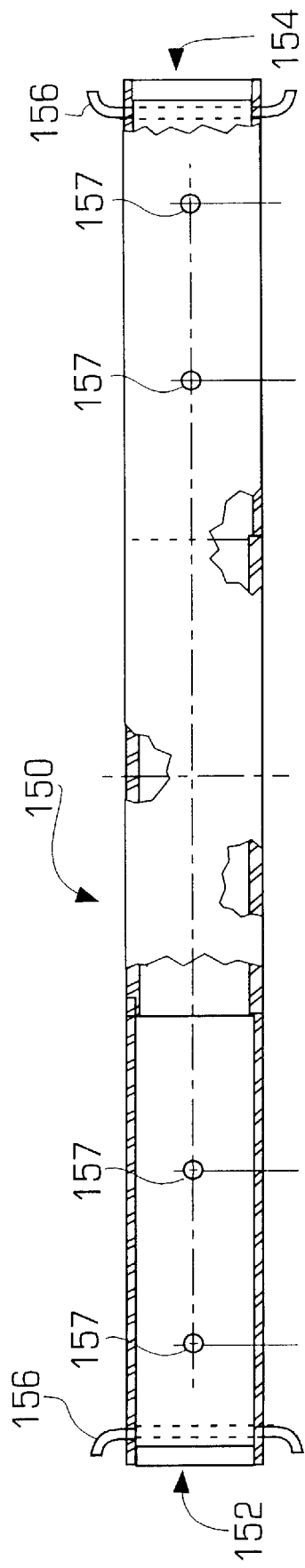
FIG. 7 is a cut-away side view of a vehicle axle that may have an axle stub with weight sensors in accordance with the invention.

FIG. 7 is a side cutaway view of a modified trailer axle 150 that may house the axle sensing assemblies that may be a part of the on-board vehicle scale in accordance with the invention. As shown, the trailer axle may be tubular, having a first open end 152 and a second open end 154 for receiving axle stubs, as described below, with the axle sensing assemblies in accordance with the invention may be placed. The axle may also have a brake plate 156 attached near the outer ends of the axle. As shown, the first and second ends of the axle are not closed or capped after a brake plate 156 so that an axle stub, as described below may be attached to the axle and the axle with the axle stubs may replace a conventional axle. The axle may also have a plurality of holes 157 that may have a bolt (not shown) threaded through in order to attach the axle stub to the axle. Now, the details of the axle stubs will be described.

Figure 8A:
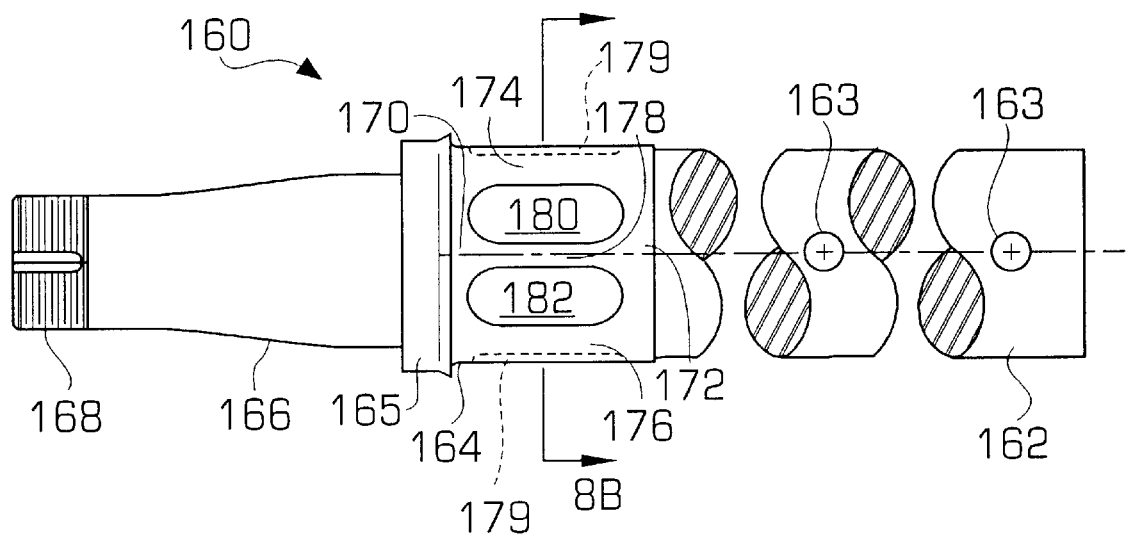
FIG. 8A is a side view of a vehicle axle stub having weight sensors in accordance with the invention.
Figure 8B:
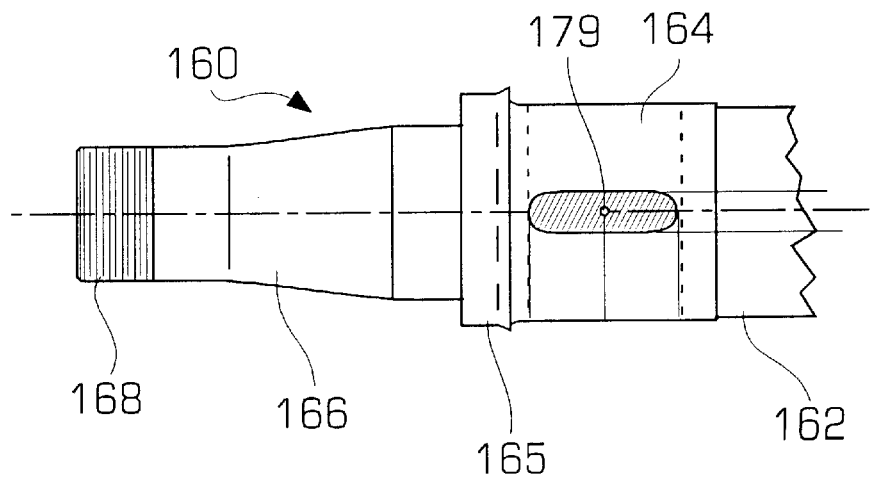
FIG. 8B is a top view of a portion of the axle stub of FIG. 8A.

FIGS. 8A and 8B show two views of an axle stub 160 in accordance with the invention that may be inserted into each end of the modified trailer axle, as described above. The axle stub may comprise a unitary member having a first elongated cylindrical portion 162, a weight sensing portion 164, a wheel supporting portion 166 and a threaded portion 168. The first portion may be inserted into the bore of the axle as described above, and may have a pair of holes 163 that align with the holes 157 in the axle so that an attachment device, as a bolt, may connect the axle stubs to the axle. The axle stub may also have a collar 165. The wheel portion may have bearings (not shown) so that a wheel may rotate on the wheel portion, and the wheel portion may also have a threaded region 168 for attaching a nut (not shown) that may attach the wheel to the axle stub.

As shown in FIG. 8A, the weight sensing portion 164 of the axle stub may comprise an integral member with apertures 180, 182 milled out to form first and second end beams 170, 172 that may be substantially parallel and spaced apart from each other, and a plurality of connecting beams 174, 176, 178 may connect the two end beams 170, 172 together. The connecting beams may be attached to the end beams at substantially right angles in order to form a parallelogram structure. The connecting beams may also be spaced apart and parallel to each other. The two apertures may be milled out completely through the weight sensing portion 164 and may be aligned parallel with each other and may preferably be parallel to the ground when the axle stub is connected to the axle. The apertures may be spaced apart equidistant from a central axis which reduces various errors due to the physical material of the weight sensing portion, such as creep and hysterisis because the connecting legs 174–178 are all manufactured from the same material and have a substantially similar elastic modulus. Since the elastic modulus of each connecting leg may be substantially similar, the errors due to material changes due to environmental effects affect each sensing element similarly and may be canceled out. A pair of sensing elements 179 may be located adjacent to the apertures 180, 182 to sense and measure the deflection of the connecting legs which is proportional to the force applied to the rear axle. For each axle stub, two sensing elements may be used so that the weight signals for the axles are produced from a total of four sensing elements and the multiple sensing element signals may be summed, trimmed, and compensated for tilt by the junction boxes, as described above, or by the indicator system, and transmitted to the sealed enclosure, as described above.

To combine the weight signals for each sensing element in the fifth wheel assembly or for each sensing element in the rear axle sensing assembly, the weight signals may be summed together at the junction boxes described above because the load exerted on the fifth wheel assembly and the rear axles should be equal to the summed weight signals. However, the sum of the weight signals alone may not accurately reflect the true weight, since errors may be introduced into the total weight signal due to mounting effects (i.e., the sensing elements may be slightly off-center). Moreover, two sensing elements may both measure the same force, and each sensing element may have slightly different characteristics. To compensate for these errors, the characteristics of each sensing element and any mounting effects may be determined and a compensation factor may be stored in a memory (not shown) in the junction boxes or the indicator system so that the signals from the various weight sensing assemblies may be adjusted for these errors. Therefore, once each weight signal is adjusted for mounting effects and the like, the weight signals may be summed together to form a fifth wheel total weight signal and a rear axle total weight signal. As described above, these total weight signals may be adjusted for any tilt and then combined to form a total trailer weight signal that may be displayed or printed on the printer or on the display enclosed within the sealed enclosure.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. An apparatus for measuring the weight of a load carried by a vehicle, the vehicle including a tractor, a trailer, and a fifth wheel assembly attached to the trailer for connecting said trailer to said tractor, the trailer having an axle rotatably supporting wheels for supporting the trailer on the ground, the apparatus comprising:

sensing means, located on the trailer, for sensing the weight of the trailer and for generating a weight value representative of the weight; and indicating means, located within the trailer, for indicating the weight value;

said sensing means comprising:

first weight sensing means associated with the fifth wheel assembly for producing a first weight signal, said first weight sensing means comprising a plurality of sensing assemblies located equidistant about said fifth wheel assembly;

second weight sensing means adjacent a first end of said axle for producing a second weight signal;

third weight sensing means adjacent a second end of said axle for producing a third weight signal; and means for combining said first, second and third weight signals to produce said weight value.

2. The apparatus of claim 1, wherein said trailer comprises a pair of rails supporting said trailer, and wherein said fifth wheel assembly comprises a central support structure having a kingpin assembly, a pair of flanges connecting said central support structure to said pair of rails through said first weight sensing means, and said first weight sensing means comprises a plurality of weight sensors, each weight sensor being attached to said flanges and said central support structure so that the weight of the trailer is communicated to said fifth wheel assembly through said weight sensors.

3. The apparatus of claim 2, wherein said first and second weight sensors each comprises a first and second substantially parallel spaced apart end members, and first and second legs connecting said end members together and defining an aperture with the weight sensor so that a response time of the weight sensor is reduced.

4. The apparatus of claim 2, wherein said axle comprises axle stubs connected to the ends of the trailer axle, and said second and third sensing means are integrally formed within said axle stubs, each of said second and third sensing means comprising first and second end beams being spaced apart and substantially parallel to each other, a connecting beam attached to the end beams, and a weight sensing element attached to said connecting beam.

5. The apparatus of claim 4, wherein each axle sensor further comprises a sensor body including said first and second end members and said connecting beam defining a first and second cutout within said sensor body that reduces the response time of the axle sensors.

6. The apparatus of claim 5, wherein said sensor body has a central axis, and said first and second cutouts are each located substantially equidistant from said central axis.

7. The apparatus of claim 6 further comprising means for sensing the tilt of said trailer, and means for compensating said weight signal for errors due to the trailer tilt.

8. The apparatus of claim 7 further comprising an enclosure, located on the trailer, for storing said indicator means including a processor so that said apparatus is legal for trade.

9. The apparatus of claim 8 further comprising a first waterproof junction box located near said fifth wheel, and a second waterproof junction box located near said axle of the trailer, said junction boxes for compensating and combining said signals from said sensing means.

10. The apparatus of claim 1, wherein said trailer comprises a pair of rails supporting the weight of the trailer, and wherein said fifth wheel assembly comprises a central structure including a kingpin and a bottom plate attached to the central structure and the kingpin, a support member attached to the central structure, a first end of said first weight sensing means being connected to said support members and a second end of the first weight sensing means being connected to said rail so that a load on said trailer is transferred through said first weight sensing means to said kingpin.

11. The apparatus of claim 10, wherein said bottom plate extends beyond said first weight sensing means and said rail to protect said first weight sensing means from damage, and wherein said bottom plate is not attached to said first weigh sensing means.

12. An apparatus for measuring the weight of a load carried by a vehicle, the vehicle including a tractor, a trailer, and a fifth wheel assembly for connecting said trailer to said tractor, the trailer having an axle rotatably supporting wheels for supporting the trailer on the ground, the apparatus comprising:

a first sensing assembly, associated with the fifth wheel assembly, for sensing the weight of the load on the fifth wheel assembly and for generating a first weight value representative of the weight on the fifth wheel assembly;

a second and a third sensing assemblies, adjacent opposing ends of the axle, for sensing the weight of the load on the axle and for generating a second weight value representative of the weight on the axle, said second and third sensing assemblies being integrally formed within associated axle stubs connected with said axle;

a processor for combining the first and second weight values to generate a total weight value; and an indicator system, responsive to the total weight value, for indicating a total weight signal;

wherein said fifth wheel assembly comprises a kingpin and a support member for distributing the load on said fifth wheel assembly, and said first sensing assembly comprises a plurality of weight sensors, each weight sensor being attached to said support member substantially equidistant from said kingpin so that each weight sensor produces equivalent weight signals for a predetermined load on the kingpin; and wherein said first sensing assembly comprises a first and second substantially parallel spaced apart end members, and first and second legs connecting said end members together and defining an aperture with the weight sensor so that a response time of the weight sensor is reduced.

13. The apparatus of claim 12 further comprising a tilt measuring device and means for compensating the weight signal for the tilt of the trailer.

14. The method of claim 13 further comprising measuring the tilt of the trailer.

15. A method for measuring the weight of a load carried by a vehicle, the vehicle including a tractor, a trailer, and a fifth wheel assembly attached to the trailer for connecting said trailer to said tractor, the trailer having an axle, the method comprising:

sensing the weight on the fifth wheel assembly with a first sensing system to generate a first weight signal, wherein said first sensing system comprises a plurality of sensing assemblies located equidistant about said fifth wheel assembly;

sensing the weight on the axle of the trailer with a second sensing system to generate a second weight signal, wherein said second sensing system is integrally formed within an axle stub connected with said axle;

combining the first weight signal and said second weight signal to generate a total weight signal; and indicating the total weight signal on a display in an enclosed space within the trailer.

16. The method of claim 15, wherein sensing the weight on the fifth wheel assembly comprises distributing the weight on the fifth wheel assembly using a support member, and sensing the strain on the support member using a first and second weight sensor.

17. The method of claim 15, wherein measuring the weight on the axle comprises placing a weight sensor at each end of the axle, measuring the strain on each weight sensor to generate strain signals, and combining the strain signals to generate a weight signal.

18. An apparatus for measuring the weight of a load carried by a vehicle, the vehicle including a tractor, a trailer, and a fifth wheel assembly attached to the trailer for connecting said trailer to said tractor, the trailer having an axle rotatably supporting wheels for supporting the trailer on the ground, the apparatus comprising:

a rail connected to a trailer for supporting the trailer; and a fifth wheel assembly attached to the trailer comprising a central structural portion including a plate and a kingpin assembly, a plurality of weight sensing assemblies, a pair of flanges connecting said central structural portion to said rail through said weight sensing assemblies, each weight sensing assembly being attached to said flanges and said central structural portion so the weight of the trailer is communicated to said kingpin through said weight sensing assemblies, wherein said plurality of weight sensing assemblies are located equidistant about said fifth wheel assembly.

19. The apparatus of claim 18, wherein said axle comprises an axle stub connected to the end of the axle, and a second and third sensing assemblies being integrally formed within said axle stub and comprise first and second end beams being spaced apart and substantially parallel to each other, a connecting beam attached to the end beams, and a weight sensing element attached to said connecting beam.

20. A fifth wheel assembly, comprising:

a central structural portion including a plate and a kingpin assembly;

a plurality of weight sensing assemblies located equidistant about said fifth wheel assembly; and a pair of flanges connecting said central structural portion to a trailer support rail through said weight sensing assemblies, each weight sensing assembly being attached to said flanges and said central structural portion so the weight of the trailer is communicated to said kingpin through said weight sensing assemblies.

* * * * *